(12) United States Patent
Alldrin et al.

(10) Patent No.: US 8,855,430 B1
(45) Date of Patent: Oct. 7, 2014

(54) REFINING IMAGE ANNOTATIONS

(75) Inventors: Neil G. Alldrin, San Jose, CA (US);
Charles J. Rosenberg, Cupertino, CA (US); Bin Shen, West Lafayette, IN (US); Samy Bengio, Los Altos, CA (US); Zhen Hao Zhou, Union City, CA (US)

(73) Assignee: Google Inc., Mountain View, CA (US)

( * ) Notice: Subject to any disclaimer, the term of this patent is extended or adjusted under 35 U.S.C. 154(b) by 253 days.

(21) Appl. No.: 13/527,783

(22) Filed: Jun. 20, 2012

Related U.S. Application Data

(60) Provisional application No. 61/653,065, filed on May 30, 2012.

(51) Int. Cl.
*G06K 9/62* (2006.01)

(52) U.S. Cl.
USPC .......................................................... 382/224

(58) Field of Classification Search
None
See application file for complete search history.

(56) References Cited

U.S. PATENT DOCUMENTS

| | | | | |
|---|---|---|---|---|
| 5,983,237 | A * | 11/1999 | Jain et al. ............................... | 1/1 |
| 7,111,082 | B2 * | 9/2006 | Okahashi ........................... | 710/8 |
| 7,499,916 | B2 * | 3/2009 | Liu et al. .............................. | 1/1 |
| 2010/0082615 | A1 * | 4/2010 | Clinchant et al. ............. | 707/728 |
| 2010/0220927 | A1 * | 9/2010 | Kim et al. ..................... | 382/170 |
| 2012/0265761 | A1 * | 10/2012 | Atsmon et al. ................ | 707/740 |

OTHER PUBLICATIONS

Weston et al. "Large Scale Image Annotation: Learning to Rank with Joint Word-Image Embeddings" Machine Learning (2010), 81(1); pp. 21-35 (16 pages).

* cited by examiner

*Primary Examiner* — Vikkram Bali
(74) *Attorney, Agent, or Firm* — Fish & Richardson P.C.

(57) ABSTRACT

Methods, systems and apparatus for refining image annotations. In one aspect, a method includes receiving, for each image in a set of images, a corresponding set of labels determined to be indicative of subject matter of the image. For each label, one or more confidence values are determined. Each confidence value is a measure of confidence that the label accurately describes the subject matter of a threshold number of respective images to which it corresponds. Labels for which each of the one or more confidence values meets a respective confidence threshold are identified as high confidence labels. For each image in the set of images, labels in its corresponding set of labels that are high confidence labels are identified. Images having a corresponding set of labels that include at least a respective threshold number of high confidence labels are identified as high confidence images.

27 Claims, 5 Drawing Sheets

REFINING IMAGE ANNOTATIONS

CROSS-REFERENCE TO RELATED APPLICATIONS

This application claims the benefit under 35 U.S.C. §119 (e) of U.S. Patent Application No. 61/653,065, entitled "REFINING IMAGE ANNOTATIONS," filed May 30, 2012, which is incorporated herein by reference in its entirety.

BACKGROUND

This specification relates to data processing and refining image annotations.

An image search apparatus can use an image relevance model to evaluate relevance between textual user queries and images. For example, the relevance of an image to a user query can be determined, in part, based on content depicted in the image or textual content associated with the image, e.g., textual content appearing on a web page in association with the image. The image relevance model can also analyze the way in which users who submit user queries interact with images responsive to the user queries. For example, an image search system may respond to a user query with one or more image search results that each depict a respective image, which are then displayed on a user device. If the user clicks on or otherwise interacts with an image search result, then the image relevance model can infer that the underlying image of the selected image search results was an image that was responsive to the user query.

SUMMARY

In general, one aspect of the subject matter described in this specification can be implemented in methods that include the actions of receiving, for each image in a set of images, a corresponding set of labels, each label being determined to be indicative of subject matter of the image; for each label, determining one or more confidence values, each confidence value being a measure of confidence that the label accurately describes the subject matter of a threshold number of respective images to which it corresponds; identifying labels for which each of the one or more confidence values meets a respective confidence threshold as high confidence labels; for each image in the set of images, identifying the labels in its corresponding set of labels that are high confidence labels; and identifying images having a corresponding set of labels that include at least a respective threshold number of high confidence labels as high confidence images. This and other implementations of this aspect include corresponding systems, apparatus, and computer program products.

Implementations of this aspect may include one or more of the following features. Determining one or more confidence values can include determining a precision value for the label. The precision value can be a percentage of images that are determined to be relevant to the label.

Determining a precision value for the label can include determining, for the label, selected images for which image search results were selected in response to a query that matches the label; and determining a percentage of the selected images that are included in the set of images and that each include the label in its corresponding set of labels. Identifying labels for which each of the one or more confidence values meets a respective confidence threshold as high confidence labels can include identifying labels having precision values that meet a precision threshold.

Determining one or more confidence values can include determining, for the label, selected images for which image search results were selected in response to a query that matches the label; and determining a number of unique images in the selected images. Identifying labels for which each of the one or more confidence values meets a respective confidence threshold as high confidence labels can include identifying labels for which the number of unique images in the selected images meets a first frequency threshold. Determining a number of unique images in the selected images can include determining images for which image search results were selected in response to a query that matches the label a minimum number of times.

Determining one or more confidence values can include determining, for the label, a number of images in the set of images that each include the label in its corresponding set of labels. Identifying labels for which each of the one or more confidence values meets a respective confidence threshold as high confidence labels can include identifying labels for which the number of images in the set images meets a second frequency threshold.

Determining one or more confidence values can include determining, for the label, selected images for which image search results were selected in response to a query that matches the label; determining, for the label, a precision value that is based on a percentage of the selected images that are included in the set of images and that each include the label in its corresponding set of labels; determining, for the label, a number of unique images in the selected images; and determining, for the label, a number of images in the set of images that each include the label in its corresponding set of labels. Identifying labels for which each of the one or more confidence values meets a respective confidence threshold as high confidence labels can include identifying each label having a precision value that meets a precision threshold, and for which the number of unique images in the selected images meets a first frequency threshold, and for which the number of images in the set images meets a second frequency threshold as a high confidence label. Aspects can further include providing the high confidence images to an image annotator as training images. The sets of labels corresponding to the images can be determined according to an image relevance model. The image relevance model can describe relationships between labels and content feature values of images.

Another aspect of the subject matter described in this specification can be implemented in methods that include the actions of receiving, for each image in a set of images, a corresponding set of labels, each label being determined to be indicative of subject matter of the image; for each label, determining one or more confidence values, each confidence value being a measure of confidence that the label accurately describes the subject matter of a threshold number of respective images to which it corresponds; and identifying labels for which each of the one or more confidence values meets at least one of a precision measurement threshold and a frequency measurement threshold as high confidence labels. This and other implementations of this aspect include corresponding systems, apparatus, and computer program products.

Determining one or more confidence values can include determining a precision value for the label. The precision value can be a percentage of images that are determined to be relevant to the label.

Determining a precision value for the label can include determining, for the label, selected images for which image search results were selected in response to a query that matches the label; and determining a percentage of the selected images that are included in the set of images and that each include the label in its corresponding set of labels. Identifying labels for which each of the one or more confidence values meets the precision measurement threshold can include identifying labels having precision values that meet the precision measurement threshold.

Determining one or more confidence values can include determining, for the label, selected images for which image search results were selected in response to a query that matches the label; and determining a number of unique images in the selected images. Identifying labels for which each of the one or more confidence values meets the frequency measurement threshold can include identifying labels for which the number of unique images in the selected images meets a first frequency measurement threshold.

Determining a number of unique images in the selected images can include determining images for which image search results were selected in response to a query that matches the label a minimum number of times.

Determining one or more confidence values can include determining, for the label, a number of images in the set of images that each include the label in its corresponding set of labels. Identifying labels for which each of the one or more confidence values meets the frequency measurement threshold can include identifying labels for which the number of images in the set images meets a second frequency measurement threshold.

Determining one or more confidence values can include determining, for the label, selected images for which image search results were selected in response to a query that matches the label; determining, for the label, a precision value that is based on a percentage of the selected images that are included in the set of images and that each include the label in its corresponding set of labels; determining, for the label, a number of unique images in the selected images; and determining, for the label, a number of images in the set of images that each include the label in its corresponding set of labels. Identifying labels for which each of the one or more confidence values meets at least one of a precision measurement threshold and a frequency measurement threshold as high confidence labels can include identifying each label having a precision value that meets a precision measurement threshold, and for which the number of unique images in the selected images meets a first frequency measurement threshold, and for which the number of images in the set images meets a second frequency measurement threshold as a high confidence label.

The sets of labels corresponding to the images can be determined according to an image relevance model. The image relevance model can describe relationships between labels and content feature values of images.

Particular implementations of the subject matter described in this specification can be implemented so as to realize one or more of the following advantages. Exclusion of labels that are difficult to correlate to images, and exclusion of images that are difficult to describe with labels from a process that refines a set of training images used to train an image relevance model results in an increase in precision of the training algorithm. An image relevance model trained with the refined set of training images can be used with an image annotator to produce labels having a higher confidence of accuracy than labels produced by training on data that do not exclude the labels and images described above.

The details of one or more implementations are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

Overview

Figure 1:
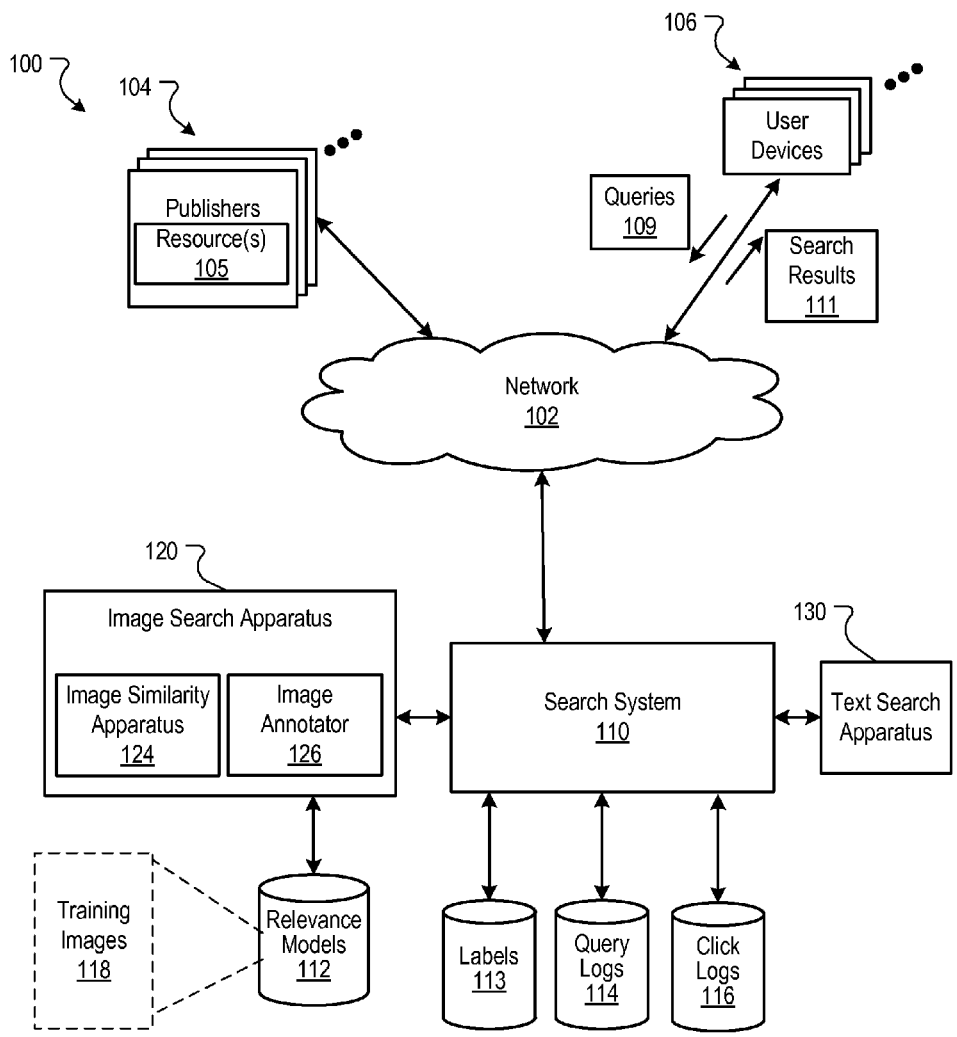
FIG. 1 is a block diagram of an example environment in which a search system provides search services.

Some search systems include an image annotator in the image relevance model. The image annotator identifies one or more text annotations (also referred to as "labels") that describe the image or parts of the image. The annotations may be derived from queries and text associated with images. For example, if a particular image satisfies an image relevance threshold, e.g., a certain number of users click on the image when the image is presented as responsive to a user query, then the image relevance model may label the image with an annotation, e.g., a term included in a query, based on the determination that the user query accurately describes the image. Likewise, annotations can also be derived from labels associated with an image, e.g., such as an image caption or text located near the image on a web page.

Other processes can also be used to determine annotations for images. For example, some image relevance modes also identify visual features of multiple images that have been identified as relevant to the same query. Multiple images that have been identified as relevant to the same query may have similar visual features, such as similar colors, brightness, shapes, edge locations, and/or other similar attributes. For example, images associated with the query "sunrise" will likely share similar colors (of a sky at sunrise) and shapes (of a sun appearing on the horizon). The attributes identified by the image relevance model can be used to further identify other images sharing the same common features that may also be relevant to a query. Further, the image annotator can use image relevance models to correlate visual features to labels. The image annotator can accept an image as input and provide one or more labels identified as relevant to the image. The relevance of the labels to the image is based, in part, on the visual features of the image.

Some labels, however, often have low precision. For example, the annotation "beach sunset in Maui" may have a low probability of being correct because there are beaches in many other locations that appear almost identical to those in Maui. The label is thus too specific to be distinguishable from an image. Another example is an annotation such as "Europe", which is so general that there is no real pattern to the images corresponding to it, making it particularly difficult for a model to be trained on the term.

An image search system can use an image relevance model to associate annotations derived from textual user queries with images. The relevance of an image to a user query can be determined, in part, based on textual content of the image or textual content associated with the image, e.g., textual content appearing on a web page in association with the image. If a user query has been determined to be relevant to an image then the user query can then be associated with the image in a database that labels images with text. An image annotator can use the database to provide text labels that describe an image. As used herein, a text label (or annotation) is a concise description of some aspect of an image, for example, a word or words describing a subject of an image.

The system and methods described in this specification are directed to selecting high confidence labels, that are, in turn, used to select high confidence images for use as input to an image label training process. A high confidence label is a label having a confidence value that exceeds a minimum threshold. The confidence value is a measure of confidence that the label accurately describes the subject matter of a threshold number of respective images to which it corresponds. Likewise, a high confidence image is an image having a corresponding set of labels that include at least a respective threshold number of high confidence labels.

The selection of high confidence labels and high confidence images take into account that some images are easy to describe with text labels and some images are difficult to describe with text labels. For example, an image of a single dog can be described with text labels such as "dog," "animal," and "Golden Retriever." Thus, the image is conceptually easy to describe with these particular text labels. In contrast, an image of Dali's painting "The Persistence of Memory" may be conceptually hard to describe with text labels. For example, the search system may determine that the image is responsive to user queries such as "Salvador Dali," "surrealism," "famous artwork," and other user queries that do not describe a subject of the image.

The identification of high confidence images and high confidence labels thus facilities the exclusion of annotations and images that, if trained upon, would decrease label precision.

Example Environment

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many web sites 104 and user devices 106, which are also sometimes referred to as client devices.

A web site 104 is a facility containing one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is any data that can be provided by the web site 104 over the network 102 and that is associated with a resource 105 address. Resources 105 include HTML pages, word processing documents, and portable document format (PDF) documents, images, video, and feed sources, to name just a few. The resources 105 can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided by the web sites 104. Data about the resources 105 can be indexed based on the resource 105 to which the data corresponds.

The user devices 106 submit search queries 109 to the search system 110. In response, the search system 110 identifies resources 105 that are responsive to, e.g., have at least a threshold relevance score for, the search query 109. The search system 110 generates search results 111 that identify the resources 105 and returns the search results 111 to the user devices 106. A search result 111 is data generated by the search system 110 that identifies a resource 105 that is responsive to a particular search query, and includes a link to the resource 105. An example search result 111 can include a web page title, a snippet of text or a portion of an image extracted from the web page, and the URL of the web page. For example, the search queries 109 can be submitted during user sessions in which a user of a user device 106 enters search queries into a user interface. During a user session, the user can be presented with search results 111.

Search results 111 are ranked based on scores related to the resources 105 identified by the search results 111, such as information retrieval ("IR") scores, and optionally a quality score of each resource 105 relative to other resources 105. The user devices 106 receive the search results 111, e.g., in the form of one or more web pages, and render the pages for presentation to users. In response to the user selecting a link in a search result 111 at a user device 106, the user device 106 requests the resource 105 identified by the link. The web site 104 hosting the resource 105 receives the request for the resource 105 from the user device 106 and provides the resource 105 to the requesting user device 106. In some examples, the search results 111 can include representations of images, for example, thumbnails of images. An image thumbnail can be clicked or otherwise invoked by a user to access the underlying image or other resource 105.

The search system 110 includes an image search apparatus 120 that is used to process queries to identify images that are responsive to (e.g., semantically related) to the search query 109. For example, a search query 109 may include text with which the search system 110 can perform an image search (e.g., a search for images that are responsive to the text).

Images may be responsive to a textual search query 109 if the images are semantically related to the text of the search query 109. The term "semantic relatedness" refers to the relatedness between text and images. A portion of text and an image are semantically related if the text describes a topic of an image or otherwise has a relationship with the content of the image. Generally, text is semantically related to an image if the text is similar to or relevant to a topic of the image. The degree to which text is semantically related can be quantified. For example, a score may be used to indicate the degree to which text is accurately related to an image. The image search apparatus 120 can, in some implementations, perform a search based on a label 113 for an image that was submitted by a user device 106 as a portion (all or a proper subset) of a search query 109.

An image label 113 ("label") is data that is indicative of subject matter to which an image is relevant. Labels 113 can be explicitly specified by a publisher of a web site 104 on which the image appears. Labels 113 can also be generated, for example, based on text that appears near the image on the web page. For example, a label 113 can be generated for an image based on text that is located adjacent to, e.g., within a threshold number of pixels of, the image or in a portion of a document that is identified as containing information relevant to the image, e.g., a frame in which the image is presented. A label 113 can also be generated based on text that is included in the image, e.g., visually depicted in the image, or otherwise associated with the image, e.g., text included in a file name, text included in anchor text of a link to the image, or resource 105 location of the image. The image annotator 126 can generate labels 113 for images.

The search queries 109 submitted during the user sessions can be stored in query logs 114. Selection data defining actions taken responsive to search results 111 provided for the user sessions can be stored in click logs 116. These actions can include whether a search result 111 was selected, e.g., whether a user interacted with the search result 111. For example, if a user selects, clicks, or otherwise invokes an image thumbnail presented as a search result 111, the click logs 116 can store a record of this interaction. The query logs 114 and click logs 116 can be used to map queries submitted during user sessions to resources 105 that were identified in search results 111 and the actions taken by users. The click logs 116 and query logs 114 can be used to map search queries 109 submitted during user sessions to resources 105 that were identified in response to the queries and that were selected by the users of the user devices 106.

Relevance Models

In some implementations, query data and image selection data (e.g., click data) are stored in the query logs 114 and click logs 116 for each unique search query 109 submitted by users. The labels 113, the query logs 114 and click logs 116 can be used to generate image relevance models 112. In some implementations, a separate image relevance model 112 is created for each query. When selecting images for reference in image search results 111 responsive to a particular query, the image search apparatus 120 calculates the relevance measures based on an image relevance model 112 that is associated with that particular query. In some implementations, an image relevance model 112 may be associated with multiple queries. For example, the image relevance model 112 can be trained based on query logs 114 and click logs 116 for more than one query.

Before the image relevance models 112 are used, they are trained by the image search apparatus 120. At a high level, the image search apparatus 120 can train an image relevance model 112 for each query by first selecting training images 118 that are relevant to that query and other images that are not relevant to the query. In some implementations, content feature values (i.e., values indicative of visual features of the image and/or other image features) for each image are extracted and are transformed into a sparse representation using a pre-computed dictionary of visual terms that represent a set of regions having similar content feature values. The extraction and transformation yields a "bag of features" for the image. Generally, the content feature values of an image quantitatively represent visual features of the image.

Thereafter, an image relevance model 112 for each query is learned. The image relevance model 112 is of the form that generates a score for an image based on the sparse representation of the image, e.g., $$IRS = W*X$$

where IRS is an image relevance score, X is a sparse vector of content feature values representing an image, and W is a vector of parameters, e.g., feature weights, learned for the model. In some implementations, the vector of feature values is a sparse vector of feature values representing an input image. In some implementations, the vector of feature values representing an input image is stored in a compressed form called an image content descriptor. The feature values can be determined by decompressing the image content descriptor into a vector of feature values.

The technique described here only represents some implementations for determining content feature values. Other implementations can use other techniques to determine content feature values. For examples, some implementations can use a non-linear model for associating content feature values and feature weights. Further, the image relevance models 112 could be trained using techniques other than techniques that determine content feature values. In general, any image relevance model 112 which correlates images to queries could be used. The image relevance model 112 may be trained for one particular query or the image relevance model 112 may be trained for multiple queries.

To select training images 118, the image search apparatus 120 identifies images as being relevant to a query based on a relevance measure between the image and the query. In some implementations, the relevance measure is based on a relevance feedback score. The relevance feedback score is a relevance measure that is generated based on user actions in response to an image appearing in search results 111. For example, click data specifying a number of times an image was selected from search results 111 for a query can represent a measure of the relevance of the image to the query. Thus, the image search apparatus 120 can derive the relevance measure, based at least in part on, the click logs 116 and query logs 114, e.g., based on numbers of times that images were presented in response to particular queries and numbers of times that users interacted with the images when presented.

Each image relevance model 112 is trained to determine the relevance of an image to a query, e.g., one of the search queries 109, based on content feature values of images for which a relevance feedback score is available. In turn, the image relevance model can be applied to content feature values of other images to determine a relevance score for the other images relative to the query. For example, the content feature values can be input to the image relevance model, which can compute and output the relevance score.

The image search apparatus 120 includes an image similarity apparatus 124 and an image annotator 126. The image similarity apparatus 124 generates data indicative of the visual similarity of images to a query image, and the image annotator 126 generates labels (e.g., textual data) indicative of a topic or subject matter to which images are related, or are otherwise semantically related to images.

The image similarity apparatus 124 includes one or more processors configured to identify images that are visually similar images to an image received by the image similarity apparatus 124 as input. In some implementations, visually similar images are images that are identical except for differences in the way the images have been processed. In general, the differences between two visually similar images are differences other than differences in visual features of the images. As one example, two identical images at different resolutions are visually similar images. As another example, two images of the same object having different brightness, contrast, or other image attributes, e.g., image attributes adjusted in image processing software, can be visually similar images. As another example, an uncropped version of an image and a cropped version of the same image, e.g., cropped to remove a border in the image, can be visually similar images. Images can be identified as visually similar images if they satisfy a similarity threshold, e.g., a similar score determined by the image similarity apparatus 124 that exceeds a similarity threshold.

Image labels can also be used to identify images that are responsive to a query. For example, the image relevance model 112 for the query can indicate which images are most relevant to the query. However, labels that have low precision (e.g., labels that have low probability of being correct), can result in unrelated images being improperly identified as responsive to a search query.

Because the image annotator 126 may associate labels with images based on user interaction with images responsive to search queries, misdescriptive labels may be associated with images based on user interaction with an image. Generally, image relevance models 112 are trained based on information describing user interaction with images and content feature values for those images. For example, the image search apparatus 120 uses user interaction data such as the query logs 114 and click logs 116 to train the image relevance models 112. However, some search queries do not correlate well to content feature values of images, and some images do not correlate well to any particular labels. The image relevance models 112 can be further refined by refining the set of training images 118 used with the relevance models.

Selecting High Confidence Labels and Images

Figure 2:
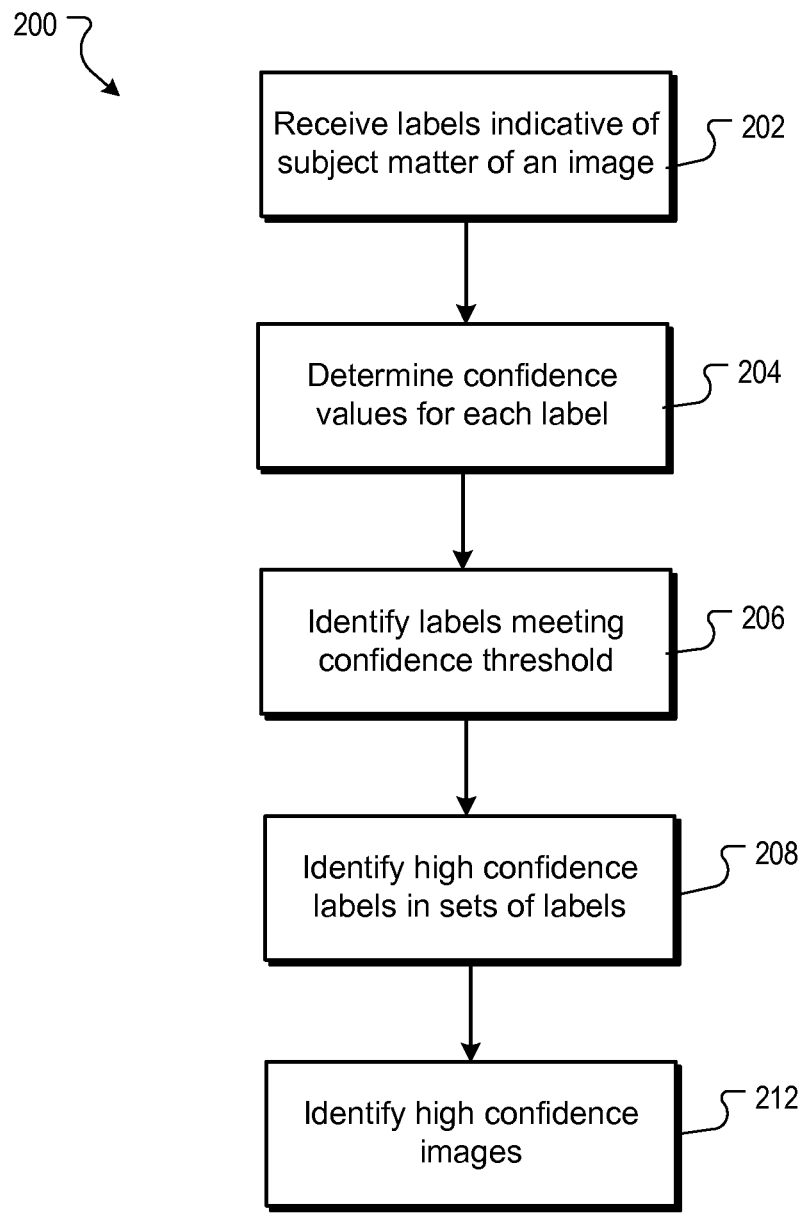
FIG. 2 is a flowchart of an example process for identifying high confidence images.

FIG. 2 is a flowchart of an example process 200 for identifying high confidence images. Other techniques may use other definitions of confidence when determining high confidence images or high confidence labels. Here, a high confidence image is an image with a corresponding set of labels that include at least a respective threshold number of high confidence labels. A high confidence label, in turn, is a label that is determined to accurately describe the subject matter of a threshold number of respective images to which it corresponds. For example, the accuracy of the label can be measured by a confidence value, and when the confidence value exceeds a minimum threshold value, the label is determined to be a high confidence label. Multiple kinds of confidence values and confidence thresholds can be used. As described below, the confidence values can include precision values and frequency values.

For example, the subject matter of an image of Dali's painting "The Persistence of Memory" or the subject matter of an image of a large crowd in a ballroom are conceptually hard to describe with text labels. While those images may be responsive to particular text queries, such as "Salvador Dali" or "crowded room," respectively, the visual features of those images may not correlate to the text queries in any meaningful way that can be modeled by a relevance model 112. In contrast, visual features of images that correlate to text queries at or above a threshold level of confidence are better candidates for training an image relevance model.

Thus, as shown in FIG. 2, a process 200 is used to identify high confidence images, for example, in a set of training images. The training images could be the training images 118 shown in FIG. 1. Once the high confidence images are identified, images that are not high confidence images can be removed from the set of training images 118 for each of several image relevance models 112.

At operation 202, for each image in a set of images, a corresponding set of labels is received. Each label has been determined to be indicative of subject matter of the image. For example, the set of images can be one or more sets of training images used to train one or more image relevance models. The set of labels can be labels identified as relevant to the respective image based on output of the image relevance models, and/or generated by the image annotator 126. For example, the set of labels may be labels identified as most likely to describe the subject matter of the image. In some examples, the set of labels is limited to a chosen number of labels. For example, operation 202 may choose a constant, k, number of labels from among the labels that are indicative of the subject matter of the image. In some implementations, an image relevance model provides a score that indicates the degree to which a label is indicative of the subject matter of an image. At operation 202, the labels may be ordered according to their score, and the top k number of labels is chosen from among the labels. The labels not among the top k labels, which are the lowest scoring labels, can be discarded.

At operation 204, one or more confidence values are determined for each label. Each confidence value is a measure of confidence that the label accurately describes the subject matter of a threshold number of respective images to which it corresponds. The thresholds used with the confidence values can be based on one or more precision thresholds and frequency thresholds. In some implementations, other metrics of confidence could be used besides precision thresholds and frequency thresholds.

Figure 3A:
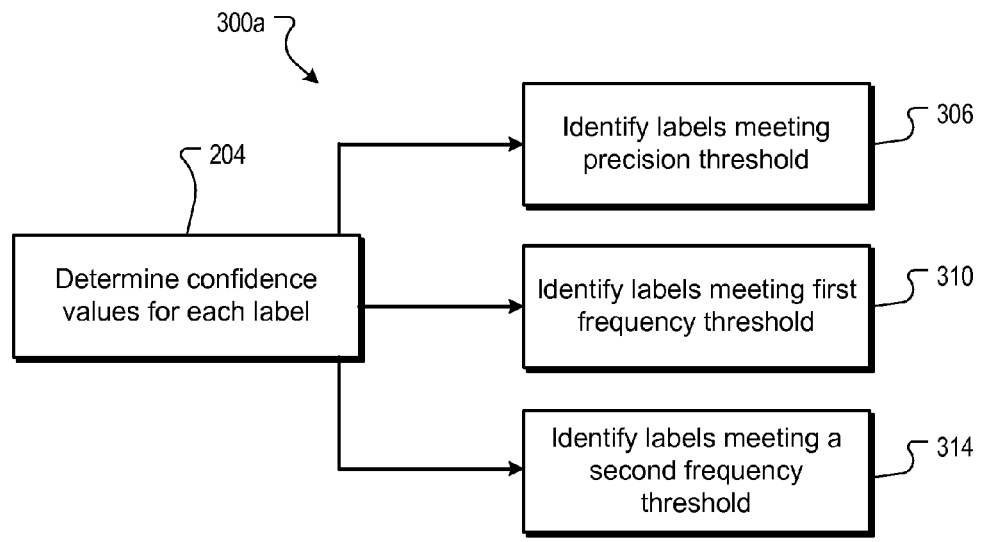
FIG. 3A is a flowchart of an example process for carrying out the operation of determining confidence values for a particular label.

FIG. 3A shows techniques for determining the confidence values. For example, the confidence value can be determined, in part, based on the way users interact with images when the images are presented as search results, e.g., the search results 111 shown in FIG. 1. This user interaction can be determined according to query logs 114 and click logs 116.

At operation 206, labels are identified for which each of the one or more confidence values meets a respective confidence threshold. For example, the confidence threshold can be chosen based on experimental data, as described below with respect to FIG. 3A-FIG. 3D. These labels are designated as high confidence labels.

At operation 208, for each image in the set of images, the labels in its corresponding set of labels are identified that are high confidence labels. In some examples, an absolute number of labels among the corresponding labels that are high confidence labels may be determined. Alternatively, a percentage of labels among the corresponding labels that are high confidence labels may be calculated.

At operation 210, the high confidence images are identified. High confidence images are those having a corresponding set of labels that include at least a respective threshold number of high confidence labels. For example, the threshold number of high confidence labels can be chosen based on experimental data, e.g., by choosing the threshold such that the precision over the remaining images meets precision requirements defined for the labels.

If relatively many high confidence labels have been identified as relevant to a particular image such that the threshold is satisfied, the image is designated as a high confidence image. If relatively few (or none) high confidence labels have been identified as relevant to the particular image such that the threshold is not satisfied, the image is not designated as a high confidence image. Images that are not high confidence images can be removed from a set of training images, or a set of training images can be generated that is made up of high confidence images. The refined set of training images can then be used to train an image relevance model used with an image annotator, e.g., the image annotator 126 shown in FIG. 1.

FIG. 3A is a flowchart of an example process 300a for carrying out the operation 204 of determining confidence values for a particular label. The process 300a can include multiple techniques for evaluating whether the values meet thresholds that can be used to determine whether the label is a high confidence label. In this example process 300a, the thresholds include a precision threshold 320, a first frequency threshold 322, and a second frequency threshold 324. Any or all of these thresholds can be evaluated, and other thresholds can be used in addition to or in place of the thresholds evaluated in the example process 300*a*. Accordingly, the example process 300*a* can carry out an operation 306 to identify labels meeting a precision threshold 320, and carry out an operation 310 to identify labels meeting a first frequency threshold 322, and carry out an operation 314 to identify labels meeting a second frequency threshold 324. Operations that can be performed to determine whether labels meet the precision threshold 320, first frequency threshold 322, and second frequency threshold 324 are detailed in FIG. 3B, FIG. 3C, and FIG. 3D, respectively.

Precision is the percentage of images selected for a query that include the query as a label. For example, of all images selected for the query "dolphin," if 80% are associated with the label "dolphin," then the precision for the label "dolphin" is 80%. A precision threshold 320 is a value which indicates whether a label meets a particular precision value. For example, if the precision threshold is 50%, then in the example above, the label "dolphin" would meet the precision threshold because the precision is greater than 50%. The precision threshold of 50% is an example, and the precision threshold can be other values, such as 30%, 60%, and 75% to name a few. The precision threshold 320 can be chosen based on experimental data, e.g., by displaying search results to human users and requesting feedback regarding whether the users perceive the results as precise. As the precision threshold is lowered, more labels can be used to describe images. In general, if more labels are used to describe a set of images, it is more likely that an image in the set can be associated with at least one label. However, this may decrease the overall precision of the labels, because the additional labels are less precise.

Figure 3B:
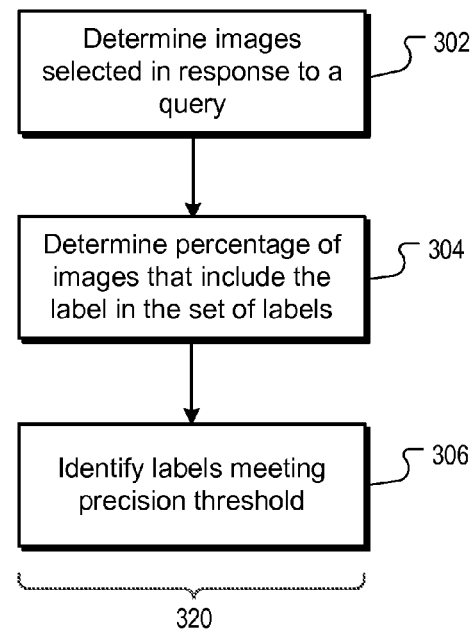
FIG. 3B is a flowchart of an example process for identifying labels meeting a precision threshold.

FIG. 3B is a flowchart of an example process 300*b* for identifying labels meeting a precision threshold. In operation 302, selected images are determined for which image search results were selected in response to a query that matches the label. For example, the images could have been represented in search results 111 presented on a user device 106, as shown in FIG. 1. Operation 302 can include an examination of the query logs 114 and click logs 116 to determine which of the images were selected or clicked by a user when the images were displayed in search results 111. For example, the query logs 114 and click logs 116 may indicate that certain images were clicked on after being presented in search results 111 responsive to the query "dolphin." In some examples, the images may include images which were used as training images 118 for an image relevance model 112. In some examples, the images may include images other than images used as training images 118 for an image relevance model 112.

Operation 304 determines which of the images are included in the set of images and, of those images, which images each include the label in its corresponding set of labels. These images are a percentage of the selected images. As indicated above with respect to operation 302, the query logs 114 and click logs 116 may indicate that certain images were clicked on after being presented in search results 111 responsive to the query "dolphin." In this example, operation 304 first determines which of those images are included in the set of images for which labels were received, for example, received in operation 202 as shown in FIG. 2. Then, in this example, operation 304 determines which, of those images included in the set of images, include "dolphin" in their respective corresponding set of labels.

Operation 306 identifies labels having precision values that meet a precision threshold. For example, of all images selected for the query "dolphin," if 80% are associated with the label "dolphin," then the precision value for the label "dolphin" is 80%. Precision values are an example of one of the confidence values that may be determined in operation 204 as shown in FIG. 2. The percentage of images determined in operation 304 may meet a precision threshold. For example, if the precision threshold is a percentage such as 50%, and fewer than 50% of the images included a label in their corresponding set of labels as determined in operation 304, then the label does not meet the precision threshold. Labels which meet the precision threshold may be identified as high confidence labels if they also meet other confidence thresholds for other kinds of confidence values. Put another way, if the label is not associated with many images selected in response to a query matching the label, the label may not be a precise description of the subject matter of the images.

Using the example of the label "dolphin," operation 302 can identify images selected—e.g., clicked on—by users when the images were presented in search results as responsive to the query "dolphin". Further, operation 304 may have determined that 80% of those identified images were included in the set of images received by the process 200 (FIG. 2) and have "dolphin" in their corresponding set of labels. If the precision threshold is less than 80%, for example, if the precision threshold is 50%, then the label "dolphin" would meet the precision threshold in operation 306.

Figure 3C:
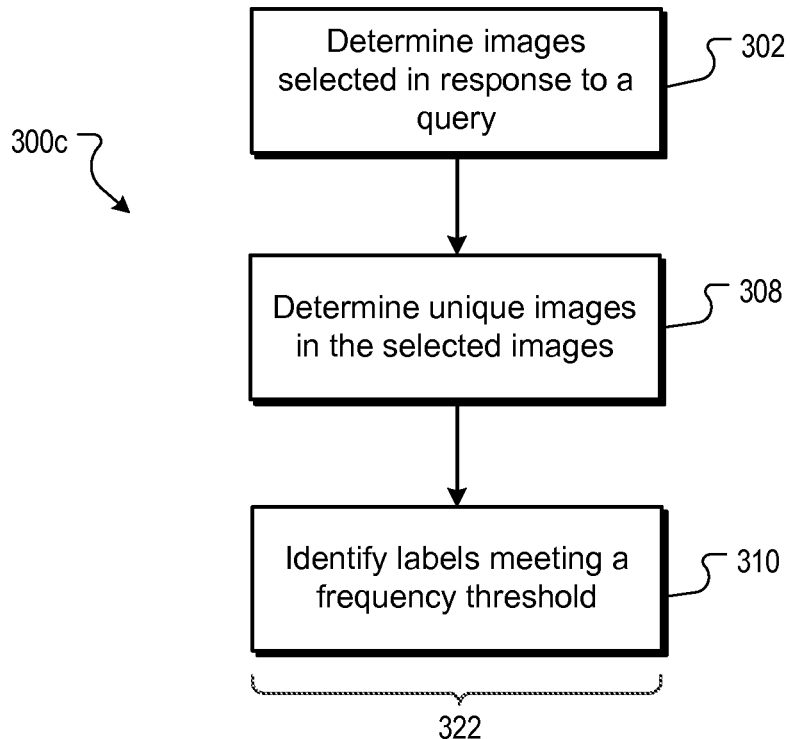
FIG. 3C is a flowchart of an example process for identifying labels meeting a frequency threshold.

FIG. 3C is a flowchart of an example process 300*c* for identifying labels meeting a first frequency threshold. Frequency is a measure of how frequently a particular label corresponds to images among a set of images. A frequency threshold is a value which indicates whether a label meets a particular frequency value. The first frequency threshold 322 used in this example process 300*c* applies to a set of images selected—e.g., clicked on—by users when the images are presented in search results to a query. The first frequency threshold 322 can be chosen based on experimental data, e.g., by displaying images and labels to human users and requesting feedback regarding whether the labels describe the images.

In operation 302, selected images are determined for which image search results were selected in response to a query that matches the label. For example, the images could have been represented in search results 111 presented on a user device 106, as shown in FIG. 1. Operation 302 can include an examination of the query logs 114 and click logs 116 to determine which of the images were selected or clicked by a user when the images were displayed in search results 111. For example, the query logs 114 and click logs 116 may indicate that certain images were clicked on after being presented in search results 111 responsive to the query "dolphin." In some examples, the images may include images which were used as training images 118 for an image relevance model 112. In some examples, the images may include images other than images used as training images 118 for an image relevance model 112. In some examples, operation 302 is also carried out as an operation of example process 300*b* as shown in FIG. 3B. The images determined by operation 302 can be used for both example process 300*b* and example process 300*c*. The operation need not be carried out twice if the same images are used as input for both example process 300*b* and example process 300*c*.

Operation 308 determines a number of unique images in the selected images determined in operation 302. In some examples, the unique images are images selected a minimum number of times when displayed in search results responsive to the query. For example, if an image was not selected a minimum number of times when displayed in search results, the image may not be relevant to the query, e.g., the image may have been clicked on accidentally one or more times. In some examples, unique images are images represented by multiple instances in search results. For example, two images may be visually similar images of each other. Visually similar images are described above with respect to FIG. 1. Operation 308 can associate multiple visually similar images such that the visually similar images can be counted as a single image.

Operation 310 identifies labels meeting the first frequency threshold. The frequency threshold may be an example of one of the confidence values determined in operation 204 as shown in FIG. 2. The labels can be labels for which the number of unique images in the selected images meets the frequency threshold. In some examples, the frequency threshold can be a number of images. If a number of selected images have a label in their corresponding sets of labels, and that number is greater than the frequency threshold, then that label meets the frequency threshold. For example, if a label appears in the corresponding sets of labels for a thousand images among the images determined in operation 302, and the frequency threshold is five hundred images, then the label meets the frequency threshold. Labels which meet the frequency threshold may be identified as high confidence labels if they also meet other confidence thresholds for other kinds of confidence values. Put another way, if the label is not associated with many images selected in response to a query, the associations between the label and images may not be enough information to be used to generate an image relevance model for that label.

Figure 3D:
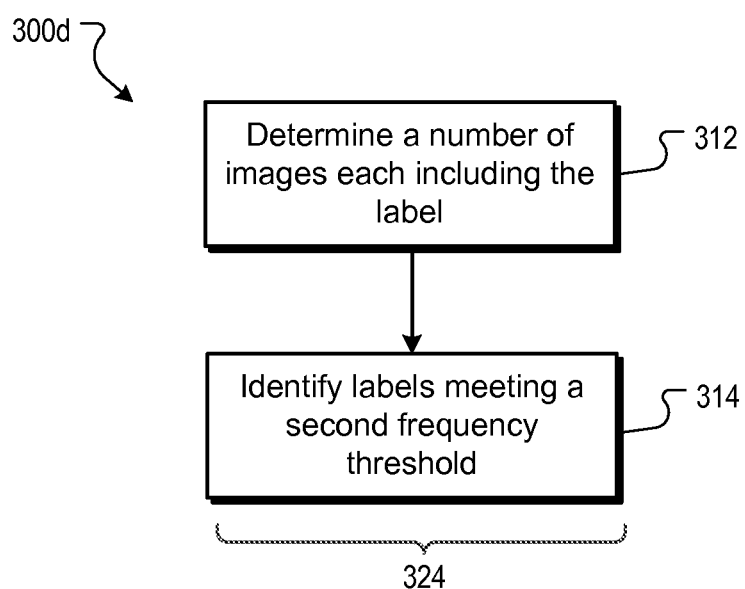
FIG. 3D is a flowchart of an example process for identifying labels meeting another frequency threshold.

FIG. 3D is a flowchart of an example process 300d for identifying labels meeting a second frequency threshold. The second frequency threshold 324 used in this example process 300d applies to the entire set of images received by the process 200 shown in FIG. 2. The frequency threshold 324 can be chosen based on experimental data, e.g., by displaying images and labels to human users and requesting feedback regarding whether the labels describe the images.

Operation 312 determines a number of images in the set of images—for example, the set of images of operation 202 shown in FIG. 2—which each include the label in their respective corresponding set of labels. Operation 314 identifies labels meeting as second frequency threshold (the second frequency threshold is different from the first frequency threshold determined in example process 300c as shown in FIG. 3C). The second frequency threshold may be an example of one of the confidence values determined in operation 204 as shown in FIG. 2. In some examples, if the number of images in the set of images that include a label in their respective corresponding set of labels is a number less than the second frequency threshold then the label does not meet the second frequency threshold. For example, if the second frequency threshold is 50%, and the label is associated with only 30% of the images in the set of images, then the label does not meet the second frequency threshold. The second frequency threshold of 50% is an example, and the second frequency threshold can be other values, such as 30%, 60%, and 75% to name a few. Labels which meet the second frequency threshold may be identified as high confidence labels if they also meet other confidence thresholds for other kinds of confidence values. Put another way, if the label is not associated with many images in the set of images, the associations between the label and images may not be enough information to be used to generate an image relevance model for that image.

Summary

Labels that meet any or all of the precision threshold 320, the first frequency threshold 322, and the second frequency threshold 324 can be identified as high confidence ("easy") labels. High-confidence labels than then be used to choose high confidence ("easy") images by identifying images associated with one or more of the identified high confidence labels. In turn, high confidence images can be used to train image relevance models, excluding images that are not high confidence images from a set of training images.

Additional Implementation Details

Figure 4:
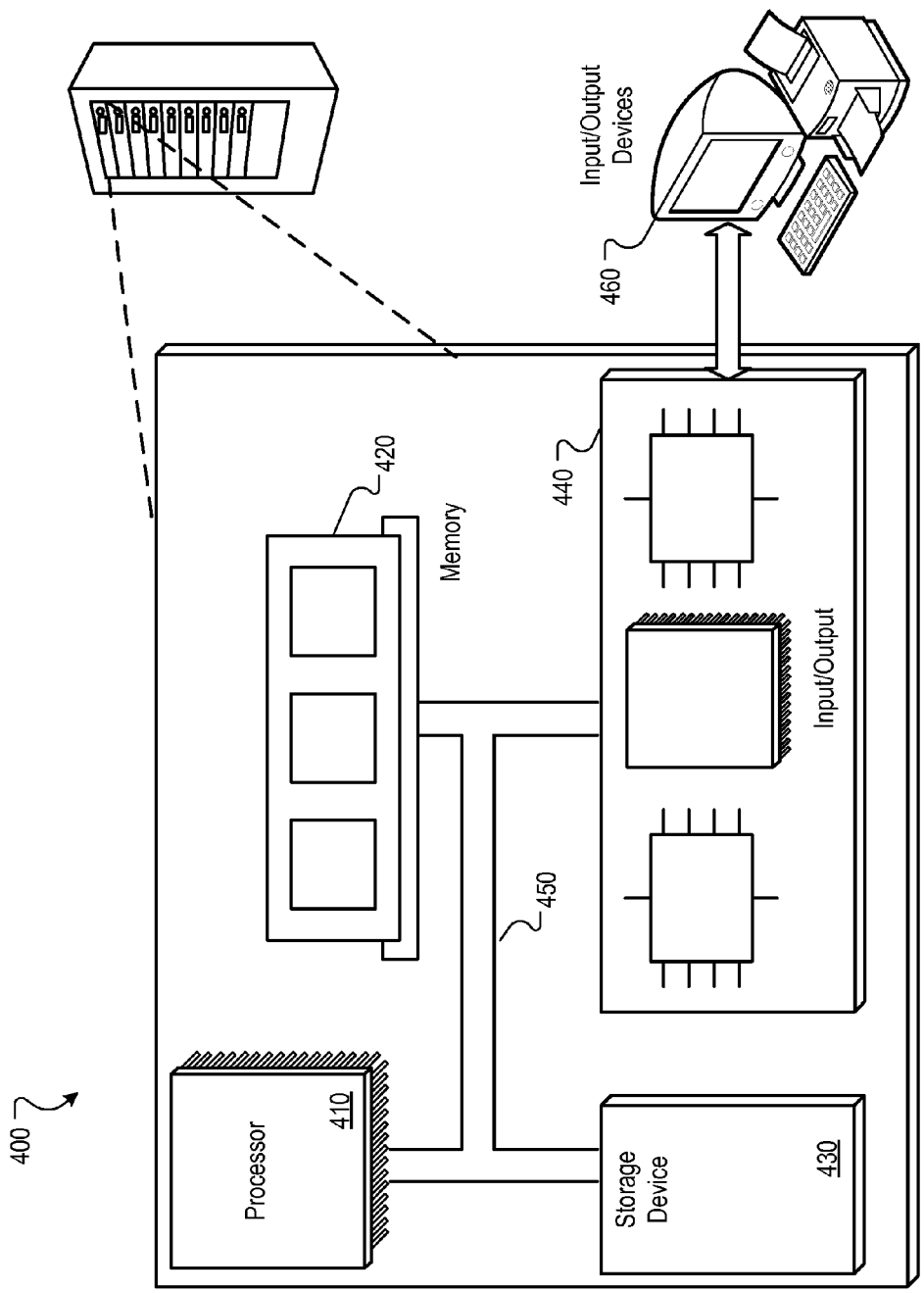
FIG. 4 is a block diagram of an example computer system.

FIG. 4 is a block diagram of an example computer system 400. For example, the system 400 could be a system or a portion of a system executing the search system 110 shown in FIG. 1. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by a data processing apparatus, comprising:
   receiving, for each image in a set of images, a corresponding set of labels, each label being determined to be indicative of subject matter of the image;
   for each label, determining, by the data processing apparatus, one or more confidence values, each confidence value being a measure of confidence that the label accurately describes the subject matter of a threshold number of respective images to which it corresponds;
   identifying, by the data processing apparatus, labels for which each of the one or more confidence values meets a respective confidence threshold as high confidence labels;
   for each image in the set of images, identifying, by the data processing apparatus, the labels in its corresponding set of labels that are high confidence labels; and
   identifying, by the data processing apparatus, images having a corresponding set of labels that include at least a respective threshold number of high confidence labels as high confidence images.

2. The method of claim 1, wherein:
   determining one or more confidence values comprises determining a precision value for the label, the precision value being a percentage of images that are determined to be relevant to the label.

3. The method of claim 2:
   wherein determining a precision value for the label comprises:
      determining, for the label, selected images for which image search results were selected in response to a query that matches the label; and
      determining a percentage of the selected images that are included in the set of images and that each include the label in its corresponding set of labels; and
   wherein identifying labels for which each of the one or more confidence values meets a respective confidence threshold as high confidence labels comprises identifying labels having precision values that meet a precision threshold.

4. The method of claim 1, wherein:
   determining one or more confidence values comprises:
      determining, for the label, selected images for which image search results were selected in response to a query that matches the label; and
      determining a number of unique images in the selected images; and
   identifying labels for which each of the one or more confidence values meets a respective confidence threshold as high confidence labels comprises identifying labels for which the number of unique images in the selected images meets a first frequency threshold.

5. The method of claim 4, wherein determining a number of unique images in the selected images comprises determining images for which image search results were selected in response to a query that matches the label a minimum number of times.

6. The method of claim 1, wherein:
   determining one or more confidence values comprises determining, for the label, a number of images in the set of images that each include the label in its corresponding set of labels; and
   identifying labels for which each of the one or more confidence values meets a respective confidence threshold as high confidence labels comprises identifying labels for which the number of images in the set images meets a second frequency threshold.

7. The method of claim 1, wherein:
   determining one or more confidence values comprises:
      determining, for the label, selected images for which image search results were selected in response to a query that matches the label;
      determining, for the label, a precision value that is based on a percentage of the selected images that are included in the set of images and that each include the label in its corresponding set of labels;
      determining, for the label, a number of unique images in the selected images;
      determining, for the label, a number of images in the set of images that each include the label in its corresponding set of labels; and
   identifying labels for which each of the one or more confidence values meets a respective confidence threshold as high confidence labels comprises:
      identifying each label having a precision value that meets a precision threshold, and for which the number of unique images in the selected images meets a first frequency threshold, and for which the number of images in the set images meets a second frequency threshold as a high confidence label.

8. The method of claim 1, further comprising providing the high confidence images to an image annotator as training images.

9. The method of claim 1, wherein the sets of labels corresponding to the images are determined according to an image relevance model, the image relevance model describing relationships between labels and content feature values of images.

10. A system, comprising:
   a data processing apparatus;
   a memory storage apparatus in data communication with the data processing apparatus, the memory storage apparatus storing instructions executable by the data processing apparatus and that upon such execution cause the data processing apparatus to perform operations comprising:

receiving, for each image in a set of images, a corresponding set of labels, each label being determined to be indicative of subject matter of the image for each label, determining one or more confidence values, each confidence value being a measure of confidence that the label accurately describes the subject matter of a threshold number of respective images to which it corresponds;

identifying labels for which each of the one or more confidence values meets a respective confidence threshold as high confidence labels;

for each image in the set of images, identifying the labels in its corresponding set of labels that are high confidence labels; and identifying images having a corresponding set of labels that include at least a respective threshold number of high confidence labels as high confidence images.

11. The system of claim 10, wherein:

determining one or more confidence values comprises determining a precision value for the label, the precision value being a percentage of images that are determined to be relevant to the label.

12. The system of claim 11:

wherein determining a precision value for the label comprises:
 determining, for the label, selected images for which image search results were selected in response to a query that matches the label; and
 determining a percentage of the selected images that are included in the set of images and that each include the label in its corresponding set of labels; and wherein identifying labels for which each of the one or more confidence values meets a respective confidence threshold as high confidence labels comprises identifying labels having precision values that meet a precision threshold.

13. The system of claim 10, wherein:

determining one or more confidence values comprises:
 determining, for the label, selected images for which image search results were selected in response to a query that matches the label; and
 determining a number of unique images in the selected images; and identifying labels for which each of the one or more confidence values meets a respective confidence threshold as high confidence labels comprises identifying labels for which the number of unique images in the selected images meets a first frequency threshold.

14. The system of claim 13, wherein determining a number of unique images in the selected images comprises determining images for which image search results were selected in response to a query that matches the label a minimum number of times.

15. The system of claim 10, wherein:

determining one or more confidence values comprises determining, for the label, a number of images in the set of images that each include the label in its corresponding set of labels; and identifying labels for which each of the one or more confidence values meets a respective confidence threshold as high confidence labels comprises identifying labels for which the number of images in the set images meets a second frequency threshold.

16. The system of claim 10, wherein:

determining one or more confidence values comprises:
 determining, for the label, selected images for which image search results were selected in response to a query that matches the label;
 determining, for the label, a precision value that is based on a percentage of the selected images that are included in the set of images and that each include the label in its corresponding set of labels;
 determining, for the label, a number of unique images in the selected images;
 determining, for the label, a number of images in the set of images that each include the label in its corresponding set of labels; and identifying labels for which each of the one or more confidence values meets a respective confidence threshold as high confidence labels comprises:
 identifying each label having a precision value that meets a precision threshold, and for which the number of unique images in the selected images meets a first frequency threshold, and for which the number of images in the set images meets a second frequency threshold as a high confidence label.

17. The system of claim 10, wherein the instructions upon execution cause the data processing apparatus to perform further operations comprising providing the high confidence images to an image annotator as training images.

18. The system of claim 10, wherein the sets of labels corresponding to the images are determined according to an image relevance model, the image relevance model describing relationships between labels and content feature values of images.

19. A non-transitory computer storage medium encoded with a computer program, the program comprising instructions that when executed by data processing apparatus cause the data processing apparatus to perform operations comprising:

receiving, for each image in a set of images, a corresponding set of labels, each label being determined to be indicative of subject matter of the image;

for each label, determining one or more confidence values, each confidence value being a measure of confidence that the label accurately describes the subject matter of a threshold number of respective images to which it corresponds;

identifying labels for which each of the one or more confidence values meets a respective confidence threshold as high confidence labels;

for each image in the set of images, identifying the labels in its corresponding set of labels that are high confidence labels; and identifying images having a corresponding set of labels that include at least a respective threshold number of high confidence labels as high confidence images.

20. The non-transitory computer storage medium of claim 19, wherein:

determining one or more confidence values comprises determining a precision value for the label, the precision value being a percentage of images that are determined to be relevant to the label.

21. The non-transitory computer storage medium of claim 20:

wherein determining a precision value for the label comprises:
 determining, for the label, selected images for which image search results were selected in response to a query that matches the label; and
 determining a percentage of the selected images that are included in the set of images and that each include the label in its corresponding set of labels; and wherein identifying labels for which each of the one or more confidence values meets a respective confidence threshold as high confidence labels comprises identifying labels having precision values that meet a precision threshold.

22. The non-transitory computer storage medium of claim 19, wherein:
   determining one or more confidence values comprises:
      determining, for the label, selected images for which image search results were selected in response to a query that matches the label; and
      determining a number of unique images in the selected images; and
   identifying labels for which each of the one or more confidence values meets a respective confidence threshold as high confidence labels comprises identifying labels for which the number of unique images in the selected images meets a first frequency threshold.

23. The non-transitory computer storage medium of claim 22, wherein
   determining a number of unique images in the selected images comprises determining images for which image search results were selected in response to a query that matches the label a minimum number of times.

24. The non-transitory computer storage medium of claim 19, wherein:
   determining one or more confidence values comprises determining, for the label, a number of images in the set of images that each include the label in its corresponding set of labels; and
   identifying labels for which each of the one or more confidence values meets a respective confidence threshold as high confidence labels comprises identifying labels for which the number of images in the set images meets a second frequency threshold.

25. The non-transitory computer storage medium of claim 19, wherein:
   determining one or more confidence values comprises:
      determining, for the label, selected images for which image search results were selected in response to a query that matches the label;
      determining, for the label, a precision value that is based on a percentage of the selected images that are included in the set of images and that each include the label in its corresponding set of labels;
      determining, for the label, a number of unique images in the selected images;
   determining, for the label, a number of images in the set of images that each include the label in its corresponding set of labels; and
   identifying labels for which each of the one or more confidence values meets a respective confidence threshold as high confidence labels comprises:
      identifying each label having a precision value that meets a precision threshold, and for which the number of unique images in the selected images meets a first frequency threshold, and for which the number of images in the set images meets a second frequency threshold as a high confidence label.

26. The non-transitory computer storage medium of claim 19, wherein the instructions upon execution cause the data processing apparatus to perform further operations comprising providing the high confidence images to an image annotator as training images.

27. The non-transitory computer storage medium of claim 19, wherein the sets of labels corresponding to the images are determined according to an image relevance model, the image relevance model describing relationships between labels and content feature values of images.

* * * * *